US011296507B2

(12) United States Patent
Goldin et al.

(10) Patent No.: US 11,296,507 B2
(45) Date of Patent: Apr. 5, 2022

(54) SMART DIM FUSE: ELECTRICAL LOAD FLEXIBILITY CONTROLLER USING SUB-CIRCUIT VOLTAGE MODULATION AND LOAD SENSING

(71) Applicant: The Board of Trustees of the Leland Stanford Junior University, Palo Alto, CA (US)

(72) Inventors: Aaron Sargent Goldin, Redwood City, CA (US); Ram Rajagopal, Palo Alto, CA (US); Claudio Rivetta, Palo Alto, CA (US); Juan M. Rivas Davila, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/030,235

(22) Filed: Jul. 9, 2018

(65) Prior Publication Data

US 2019/0013670 A1    Jan. 10, 2019

Related U.S. Application Data

(60) Provisional application No. 62/529,814, filed on Jul. 7, 2017.

(51) Int. Cl.
*H02J 3/14* (2006.01)
*H02J 3/38* (2006.01)
(Continued)

(52) U.S. Cl.
CPC .......... *H02J 3/14* (2013.01); *H01H 85/0241* (2013.01); *H02H 3/093* (2013.01); *H02J 3/382* (2013.01);
(Continued)

(58) Field of Classification Search
None
See application file for complete search history.

(56) References Cited

U.S. PATENT DOCUMENTS 5,592,353 A * 1/1997 Shinohara ............... G06F 1/305
361/23
5,675,503 A   10/1997 Moe et al.
(Continued)

OTHER PUBLICATIONS

Oruganti, R., Inductor voltage control of buck-type single-phase AC-DC converter, Mar. 2000, IEEE, 10.1109/63.838114 (Year: 2000).*

(Continued)

*Primary Examiner* — Robert A Cassity
(74) *Attorney, Agent, or Firm* — Lumen Patent Firm

(57) ABSTRACT

Improved control of electrical power consumption is provided with "Smart Dim Fuses" (SDF) which can alter their output voltage as provided to the load circuits they are connected to. SDF units can replace conventional circuit breakers in electrical panels. The voltage control capability provided by SDF units can lead to improved control of electrical power consumption, since many loads can smoothly operate at lower power consumption when the voltage they are driven with decreases. SDF units can comply with relevant safety requirements, such as uninterrupted neutral connections between electrical mains and load circuits. SDF units can also provide a current limiting function that can substitute for the protective action of conventional circuit breakers.

13 Claims, 12 Drawing Sheets

(51) Int. Cl.
*H01H 85/02* (2006.01)
*H02H 3/093* (2006.01)
*H02H 9/02* (2006.01)

(52) U.S. Cl.
CPC ....... *H01H 2085/0266* (2013.01); *H02H 9/02* (2013.01); *H02J 2310/14* (2020.01)

(56) References Cited

U.S. PATENT DOCUMENTS

| | | | | |
|---|---|---|---|---|
| 6,169,669 | B1* | 1/2001 | Choudhury | H02J 9/062 307/66 |
| 8,766,478 | B2* | 7/2014 | Liu | H02J 4/00 307/82 |
| 9,342,062 | B2 | 5/2016 | Allmaras et al. | |
| 2002/0024332 | A1* | 2/2002 | Gardner | H02J 3/14 324/103 R |
| 2004/0079626 | A1 | 4/2004 | Haq | |
| 2005/0015182 | A1* | 1/2005 | Bebic | H02J 3/1842 700/286 |
| 2005/0028017 | A1* | 2/2005 | Janakiraman | H02J 1/10 713/340 |
| 2010/0076615 | A1* | 3/2010 | Daniel | H02J 3/28 700/293 |
| 2011/0234000 | A1* | 9/2011 | Yan | H02M 3/157 307/31 |
| 2012/0004871 | A1* | 1/2012 | Tsao | G01R 19/2513 702/61 |
| 2012/0049808 | A1* | 3/2012 | Nakai | G06F 1/28 323/234 |
| 2012/0066524 | A1* | 3/2012 | Kim | H02J 50/80 713/310 |
| 2014/0084682 | A1 | 3/2014 | Covic et al. | |
| 2014/0288719 | A1* | 9/2014 | Kanayama | H02J 3/32 700/286 |
| 2017/0038787 | A1* | 2/2017 | Baker | H05B 47/19 |
| 2017/0111976 | A1* | 4/2017 | Van Endert | H05B 47/18 |

OTHER PUBLICATIONS

Hajimoradi, M. R., AC voltage regulator based on AC/AC buck converter, Sep. 1, 2016, IEEE, 10.1109/PEDSTC.2016.7556852 (Year: 2016).*
CES white paper US-090701, date unknown.
Ozadowicz, "A New Concept of Active Demand Side Management for Energy Efficient Prosumer Microgrids with Smart Building Technologies", Energies v10, Nov. 2017.
Wilson, "End of the circuit breaker: smart power makes its mark", 2002.

* cited by examiner ns507 B2

SMART DIM FUSE: ELECTRICAL LOAD FLEXIBILITY CONTROLLER USING SUB-CIRCUIT VOLTAGE MODULATION AND LOAD SENSING

CROSS REFERENCE TO RELATED APPLICATIONS

This application claims priority from U.S. Provisional Patent Application 62/529,814 filed Jul. 7, 2017, which is incorporated herein by reference.

GOVERNMENT SPONSORSHIP

This invention was made with Government support under contract DE-AR0000697 awarded by the Department of Energy. The Government has certain rights in the invention.

FIELD OF THE INVENTION

This invention relates to improved control of electrical power consumption.

BACKGROUND

The ability to control electrical power consumption intelligently is of increasing interest due to the rising prevalence of energy sources with variable output, such as wind and solar. In order to best utilize such energy sources, it will be beneficial to control the electrical power consumption of loads with greater precision than conventional approaches such as simply turning off large loads at high demand times of the day.

SUMMARY

The main idea of the present approach is to provide local control units that have two main capabilities: 1) altering voltages provided to their load electrical circuits responsive to control signals without interrupting power to the load electrical circuits, and 2) providing real time data on power consumption vs. voltage of the load electrical circuits responsive to data request signals. Such local control units can be used as replacements for conventional fuses or circuit breakers, so the local control units are connected between an electrical main and a load electrical circuit within a building. Each circuit being controlled will have its corresponding local control unit. Local control units can optionally provide further capabilities, including but not limited to: reporting on transient events and harmonic composition to be used in load learning and forecasting algorithms, and reporting to learn user preferences.

Practice of the invention does not depend critically on details of how the local control units are themselves controlled. In one approach, a central control unit can control the local controllers present in a building. Such control can also be done in a more or less distributed manner, as may be appropriate for a large industrial facility having several building, each building having its corresponding set of local control units for some or all of its circuits.

DETAILED DESCRIPTION

I. Introduction

Demand for renewable electricity generation, namely wind and solar generators, is increasing rapidly. Accommodating this growing share of intermittent electricity generation on the grid requires the addition of significant energy storage, demand, and supply flexibility in a cost efficient way. There is an opportunity for distributed energy resources (DERs) at the grid edge to supply some of this flexibility, as the distribution networks are utilized at only at 30% of their capacity. Aggregation of load based DERs (often called demand response) is a promising approach to providing this much needed flexibility. Other DERs, such as solar generation, electric vehicle batteries, or residential/commercial battery systems are inherently smart and controllable, with the capability to respond to an aggregators signals easily accessed through the device API. Load-based DERs, on the other hand, lack any built in mechanism for responding to an aggregator's signals, requiring some additional hardware or retrofit. There are a number of methods and products commercially available, but they are typically limited to smart thermostats for air conditioners, and networked contactors to toggle devices such as HVAC, heaters, or pumps. These internet-connected thermostats and contactors are effective, but require temporary interruptions of service to utilize the load as a resource.

Here we describe the Smart Dim Fuse (SDF), which is a general purpose load management hardware system that provides novel functionality to improve the efficacy and adoption of aggregated load control, particularly in the residential sector. The concept is that the SDF will work as a circuit breaker replacement device, and could be installed at a breaker panel for select circuits. For each of the circuits, the SDF can control the voltage (and thus power for appropriate loads), measure the voltage and current, and use this data to report resource availability statistics to the aggregator. Additionally, the SDF will offer fault monitoring and additional safety superior to conventional thermal-magnetic breakers in use today.

Figure 1A:
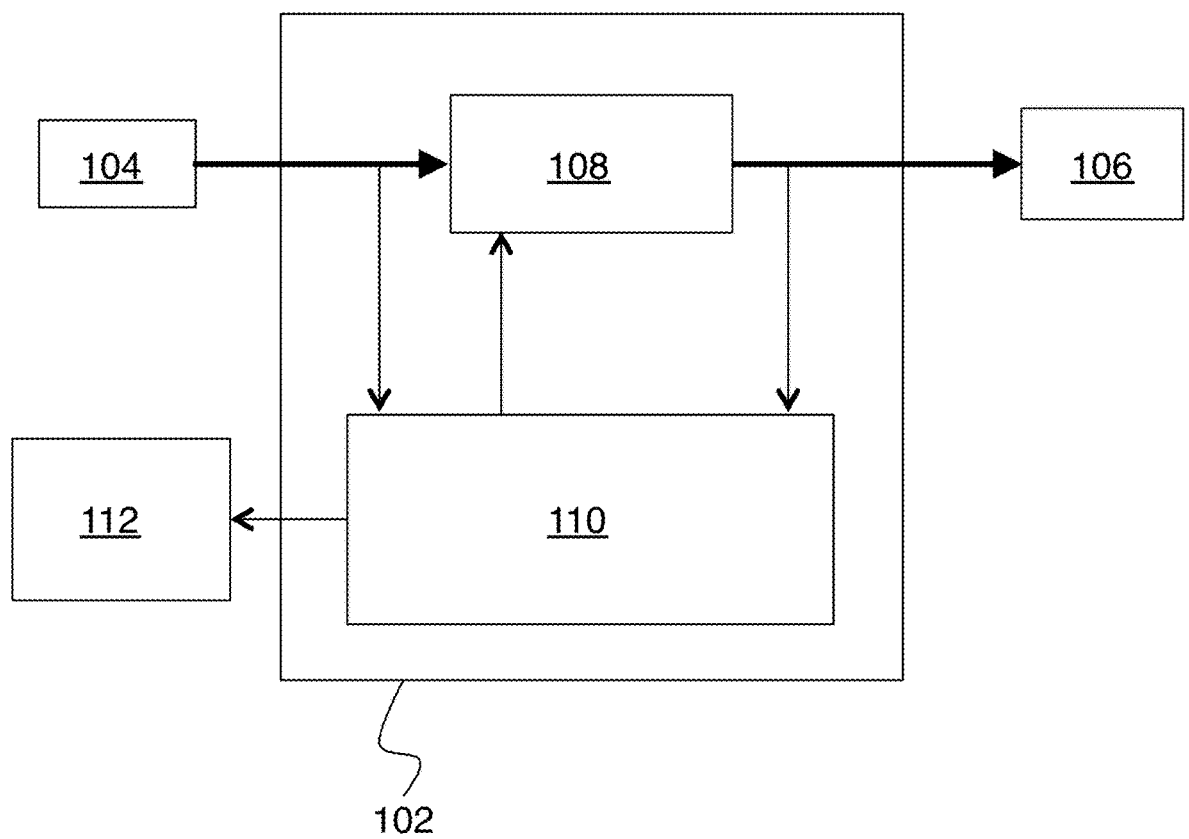
FIGS. 1A-C show several block diagram of exemplary embodiments of the invention.
Figure 1B:
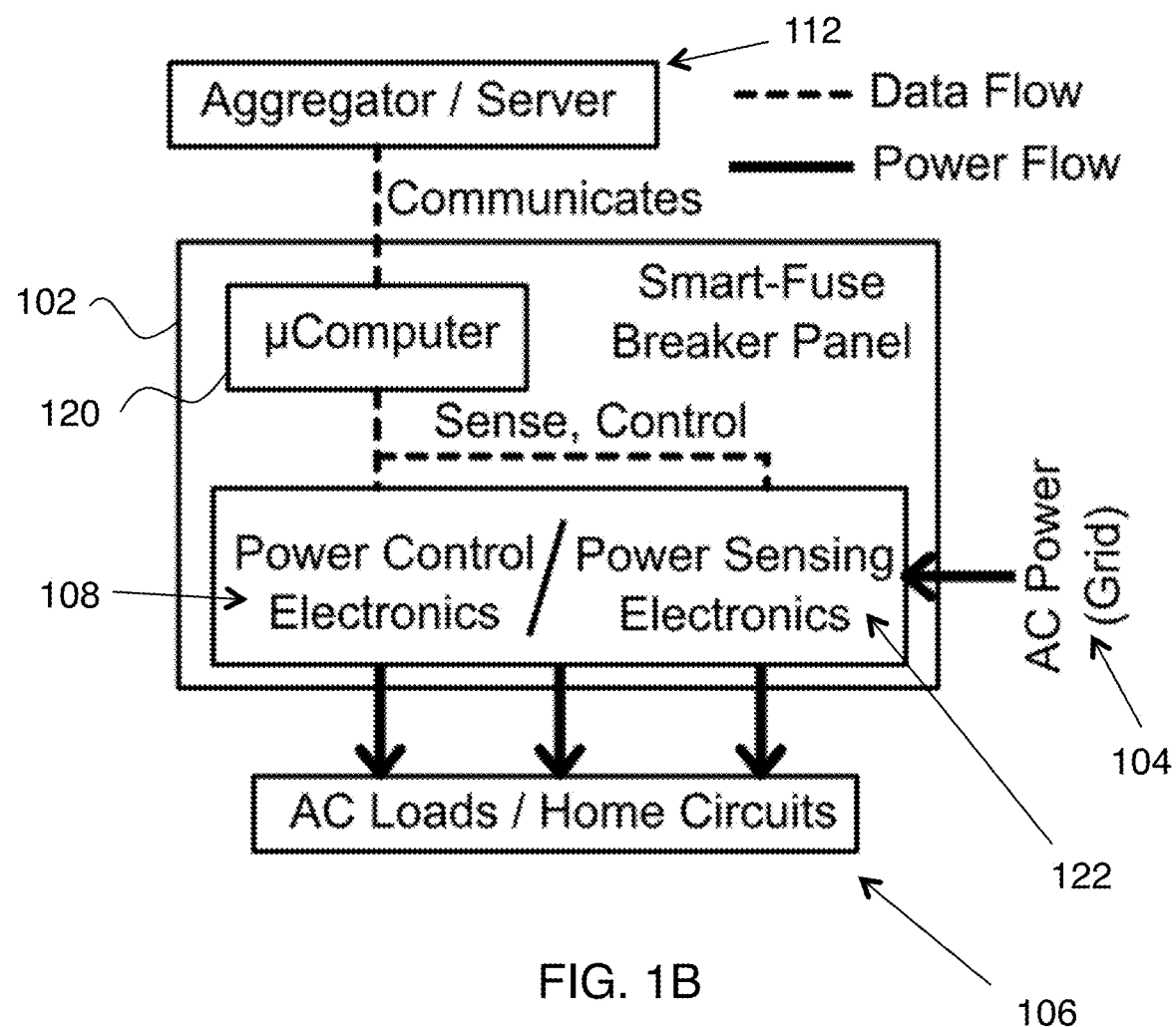
Figure 1C:
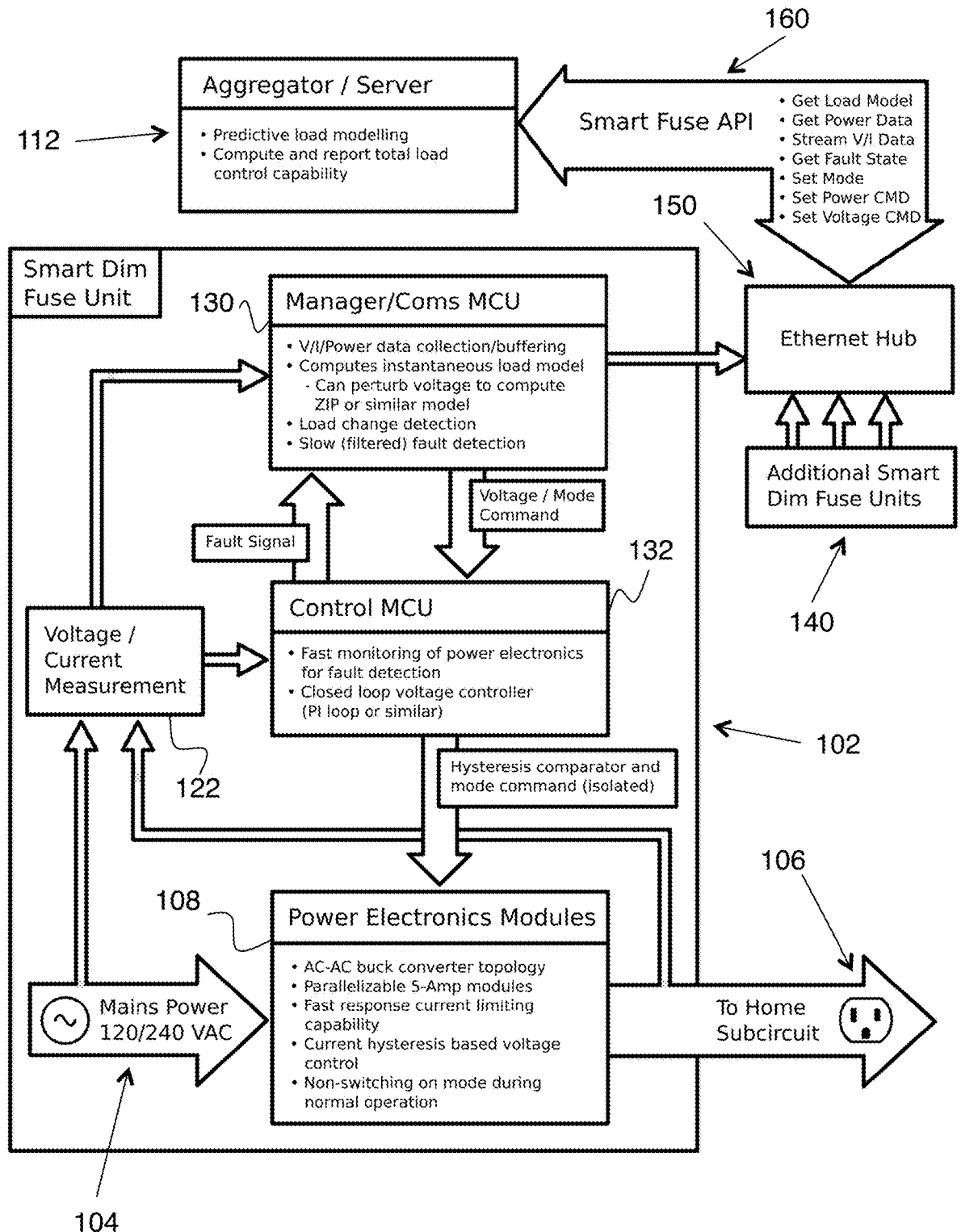
Figure 2A:
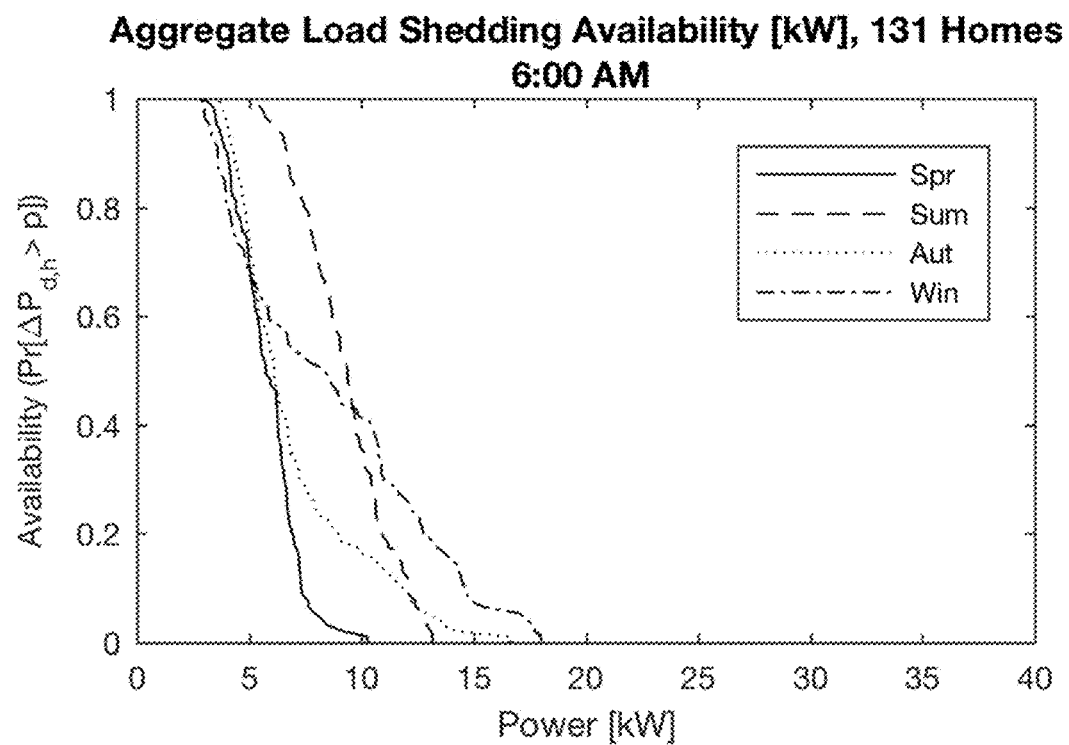
FIGS. 2A-D show exemplary plots of aggregate load shedding availability at several times of day.
Figure 2B:
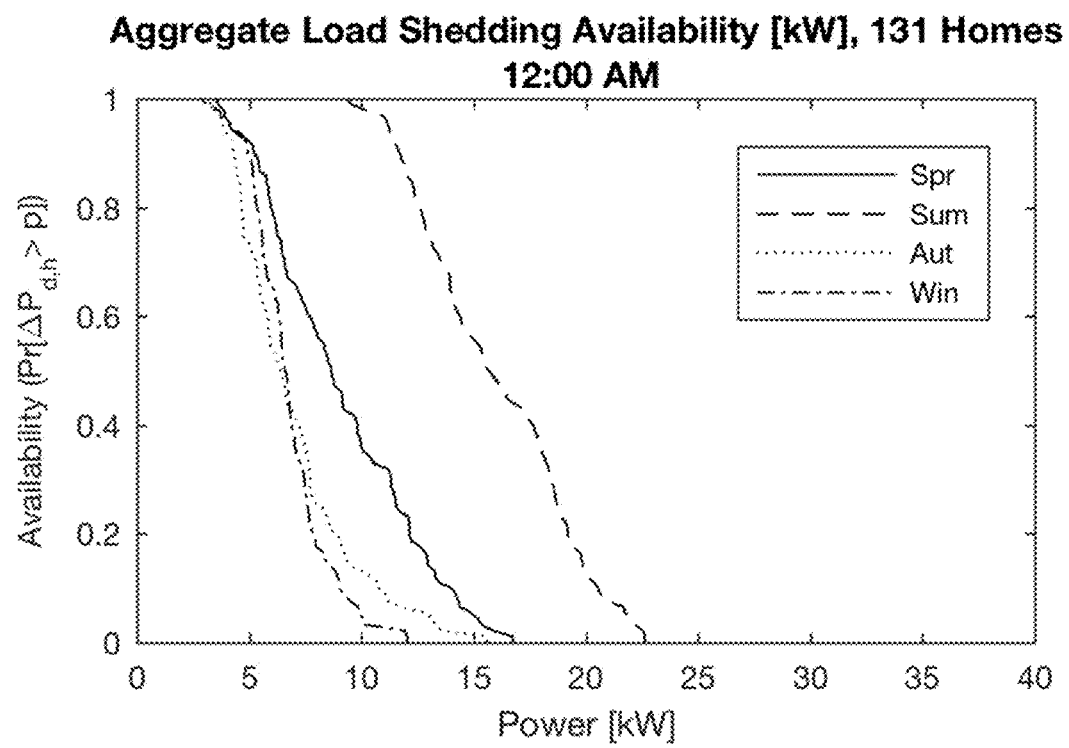
Figure 2C:
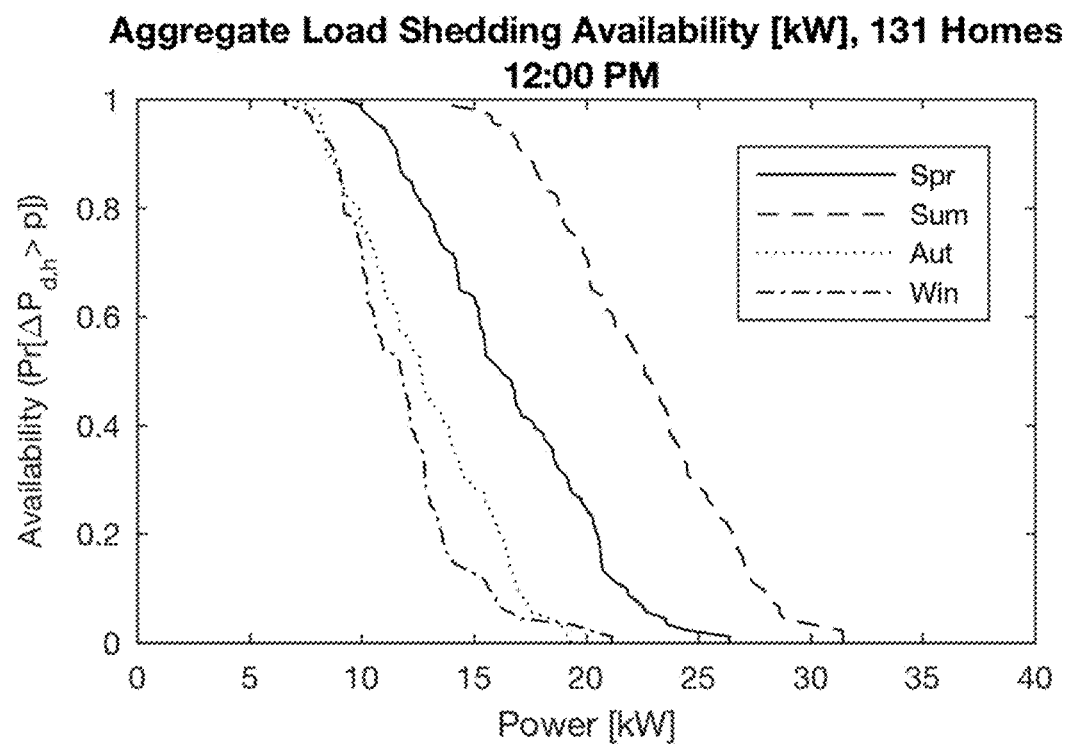
Figure 2D:
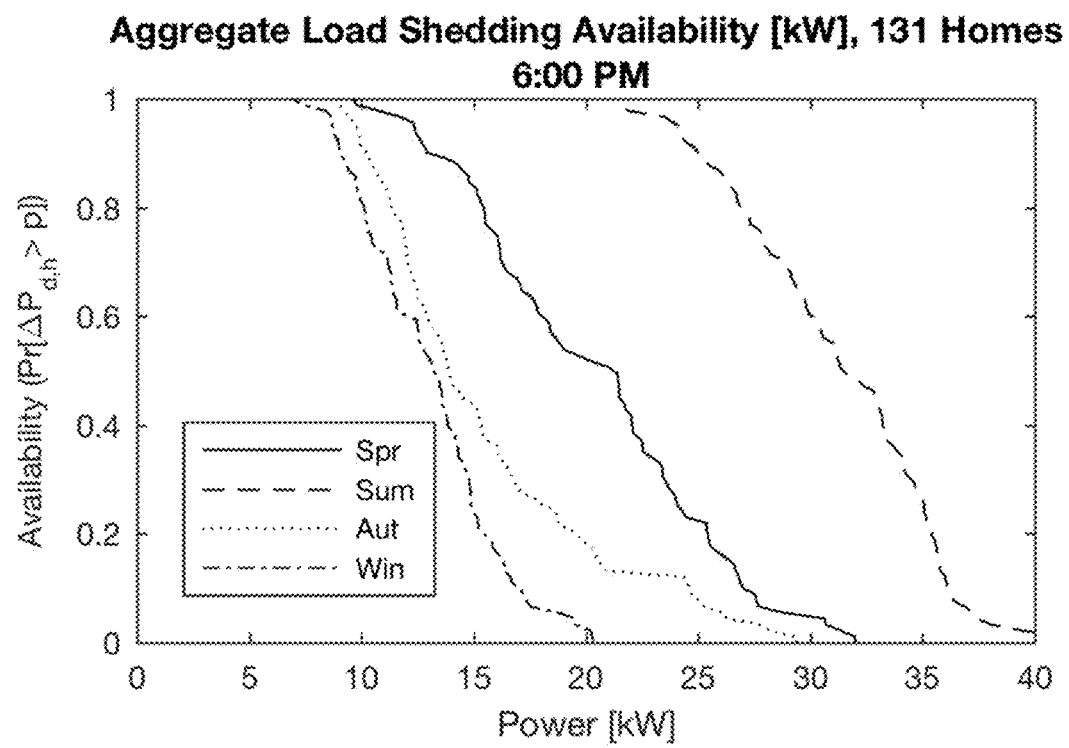

FIGS. 1A-C show three exemplary block diagrams for this idea at increasing levels of detail. FIG. 1A is the simplest example. Here an apparatus for managing electrical power consumption includes at least one local control unit 102 (i.e., a Smart Dim Fuse) configured to be connected between an electrical main 104 and a load electrical circuit 106 within a building. The local control unit 102 is configured to alter an output voltage it provides to the load electrical circuit 106 responsive to a control signal without interrupting power to the load electrical circuit. This can be accomplished with a power electronics module 108 and a local controller 110. The local control unit 102 is configured to provide real time data on current vs. voltage of the load electrical circuit 106 responsive to a data request signal. Such real time data can be provided to a global controller 112. In operation, the local control unit(s) can be controlled by global controller 112, where global controller 112 provides the control signals and the data request signals, and receives the real time data on current vs. voltage of the load electrical circuits. Preferably, the local control unit is configured as a replacement for a circuit breaker in an electrical panel.

FIG. 1B shows a more detailed exemplary block diagram showing power monitoring, control, and communications to an aggregator server. Here block 110 of FIG. 1A is split into a sensor module 122 and a control module 120. FIG. 1C shows an exemplary diagram having further details relating to preferred embodiments. Here control module 120 of FIG. 1B is split into Manager/Comms MCU (master control unit) 130 and control MCU 132. Additional SDF units are collectively referenced as 140. These additional SDF units amount to additional local control units as described above. These local control units can be connected via network 150 (e.g., Ethernet) and have an API (application programming interface) 160 for their building-level control by global controller 112. Local control units 102 can communicate with the global controller 112 via a wired or wireless network 150. An API 160 for such a system can include get/set commands such as: set on-state mode (voltage control, continuous on); set voltage or power reduction commands; get power consumption; get load model; get fault state; get streaming voltage and current data.

Preferably, as shown on FIG. 1C, the power electronics modules 108 are AC-AC buck converters (as described in greater detail below) that use current hysteresis control with an outer control loop to set the output voltage.

Preferred embodiments can include the following features, either individually or in any combination: operation at both 120 and 240 VAC; modular design (e.g., 5 A RMS modules, such that a 15 A load circuit would used 3 5 A modules in parallel); capable of providing high inrush currents to loads with initial low impedance conditions; capable of withstanding and detecting short circuit conditions; measure load circuit voltage and current with 1% accuracy at a sampling rate of 1 kHz or more and more preferably around 10 kHz; use voltage perturbation and measurement to generate a load model, such as a ZIP (constant Z, constant I, constant P) model or other appropriate model.

II. Evaluation of Resource Availability

The use of voltage control to modulate load power consumption is clearly beneficial to the consumer. By reducing the voltage of a circuit, it is possible to reduce the power consumed by many types loads without interrupting functionality. However, it is important to quantify this resource. First, we establish the relationship between AC voltage and power consumption on an appliance level. Second, we use a disaggregated data set which includes detailed appliance level power consumption to evaluate the aggregate power controllability for various levels of voltage modulation. It is important to note, that unlike conservation or efficiency measures, the proposed voltage based control is not an energy resource. Rather, the resource is flexibility in consumption, allowing aggregators to participate in ancillary service markets such as load following or regulation, particularly services with signals that are controlled to be zero-mean (or zero-energy) periodically.

The highest energy consumption loads, such as air conditioners, electric water heaters, or furnaces are typically thermostatically controlled. Dimming the voltage will reduce the instantaneous power consumption, but the duty cycle will increase to compensate, effectively deferring the load without an interruption of service.

IIA. Appliance Power Flexibility

Table I shows the range of power consumption (flexibility) for different voltage ranges for some of the appliances measured by Bokhari et al. (IEEE Trans. Power Delivery, v29n3, pp 1372-81, 2014, hereby incorporated by reference in its entirety), shown as a percentage of the baseline power consumption of each device. The baseline power consumption is the power for a device at 120 VAC. We are interested in the flexibility offered by 12 Vrms reduction, as this voltage range (120-108 VAC) falls within the ANSI C84.1 standards for utilization voltage range. Thus, we can think of flexibility within this range as freely available, with no perceptible change in quality of service. We are also interested in the maximum flexibility possible without interruption of service (but with potentially reduced service quality).

For this study, we chose maximum voltage reduction of 30 Vrms reduction, which corresponds to the maximum cut-out voltage reported in Bokhari et al. for the included appliance models. However, depending on the appliance response to voltage reduction, the minimum power consumption may be at a voltage greater than 90 VAC. For instance, the air conditioner reaches its minimum power consumption at 95 VAC.

TABLE 1

Appliance load flexibility

| Appliance | $P_{120\,V}$ (W) | $\Delta P_{108\,V}/P_{120\,V}$ | $\Delta P_{90\,V}/P_{120\,V}$ |
|---|---|---|---|
| Air Conditioner | 496 | 0.0393 | 0.0556 |
| Fan | 163 | 0.0817 | 0.22188 |
| Halogen Bulb | 97.4 | 0.1514 | 0.36125 |
| LED Bulb | 3.38 | 0.2232 | 0.53625 |
| Microwave | 1366 | 0.0681 | 0.11812 |
| Refrigerator | 120 | 0.0393 | 0.0556 |
| Heating Element | 915 | 0.1806 | 0.4275 |

It is important to determine and predict the loads and their controllability. In this context, controllability means the extent to which the power consumption of a given load can change in response to changes in voltage. Load controllability can be described by the voltage-current relationship, with the additional constraint that different loads might have different operational voltage ranges. These load models can be used by the global control to aid in the prediction and planning of demand side resources for its own internal optimization, as well as to report to the optional higher level control. To provide a full picture of load-side resource availability, it is important to provide both the instantaneous controllability, as well as the forecasting of the loads at a sub circuit level. A database of power controllability vs. appliance type can be used to improve building-level load control.

IIB. Statistical Availability of Load Flexibility

We use the disaggregated data of 131 homes in Pecan Street over one year (March 2014 to March 2015, data available online) to get a statistical view of the power consumption flexibility. The Pecan St. data gives power consumption at hourly time steps broken down by individual appliance. Thus, for each appliance we can evaluate the change in power consumption for a given voltage modulation, and then sum the change in power across all the appliances for each household. Only appliances with significant energy consumption were included in the study. Lighting circuits were also excluded from the study, because dimming lights would be a noticeable and potentially undesirable outcome. Other smaller appliance and outlet circuits are excluded because of their minimal energy contribution. The appliances included in the study are: air conditioners, electric furnaces, electric dryers, hot water heaters, ovens, ranges, refrigerators, vent-hoods, and microwaves. Another practical consideration is that most of these appliances are installed on dedicated circuit breakers or the kitchen circuit, potentially reducing the number of SDF units needed to be installed.

The aggregate power control capability for any given hour is computed as the sum of the recorded power consumption for each appliance multiplied by the corresponding controllability range determined by the voltage range. Formally, the computation of aggregate power controllability for a given household is:

$$\Delta P_{d,h} = \Sigma_{b=1}^{m} \Sigma_{k=1}^{n} C_{k,v} P_{k,b,d,h} \quad (1)$$

where $P_{k,b,d,h}$ is the power consumed by appliance k in building b on day d and hour h, $C_{k,v}$ is the controllability factor for appliance k for a maximum voltage modulation v, and $\Delta P_{d,h}$ is the aggregate controllability at that day and hour. Here m is the number of homes to be aggregated, and n is the number of appliances considered for power control.

It is now possible to plot the statistical availability of the load control capability as a generation availability curve. Here we define availability of load shedding power p as:

$$\text{avail}_T(p) = Pr[\Delta P_{d,h} > p], T_1 \leq d \leq T_2 \quad (2)$$

FIGS. 2A-D show the load shedding availability for various times of day for each season. This is computed for each season, each hour of the day. We show four examples: FIGS. 2A, 2B, 2C, 2D relate to 12:00 AM, 6:00 AM, 12:00 PM, 6:00 PM, respectively. This is the total for all 131 homes under test. We see that both the mean and statistical distribution of the available load curtailment vary significantly with time-of-day and season.

Because the aggregate load is dominated by air conditioners, the distribution of shedding availability depends largely on the variability in the weather. Thus, these distributions do not necessarily reflect the statistics or confidence of a prediction (for instance, the variance of a day-ahead prediction which couples weather and use models could be significantly lower than the variance indicated by these availability curves). Rather, these availability curves should be taken to show statistical availability for a general time of year.

It is also useful to look at the mean of $\Delta p_{d,h}$ over some period of days to show monthly or seasonal variations in the expected aggregate power flexibility at a given hour, given by:

$$\Delta P_{T,h} = \frac{1}{T_2 - T_1} \sum_{d=T_1}^{T_2} \Delta P_{d,h} \quad (3)$$

Figure 3A:
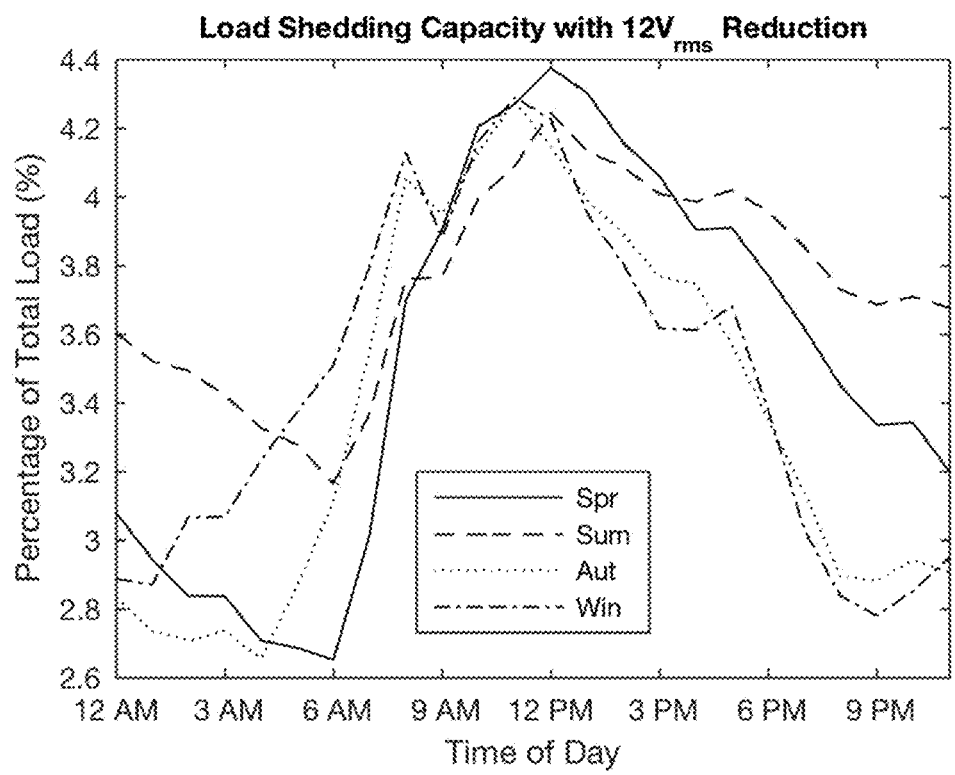
FIGS. 3A-B show plots of hourly mean load flexibility for the data set of FIGS. 2A-D.
Figure 3B:
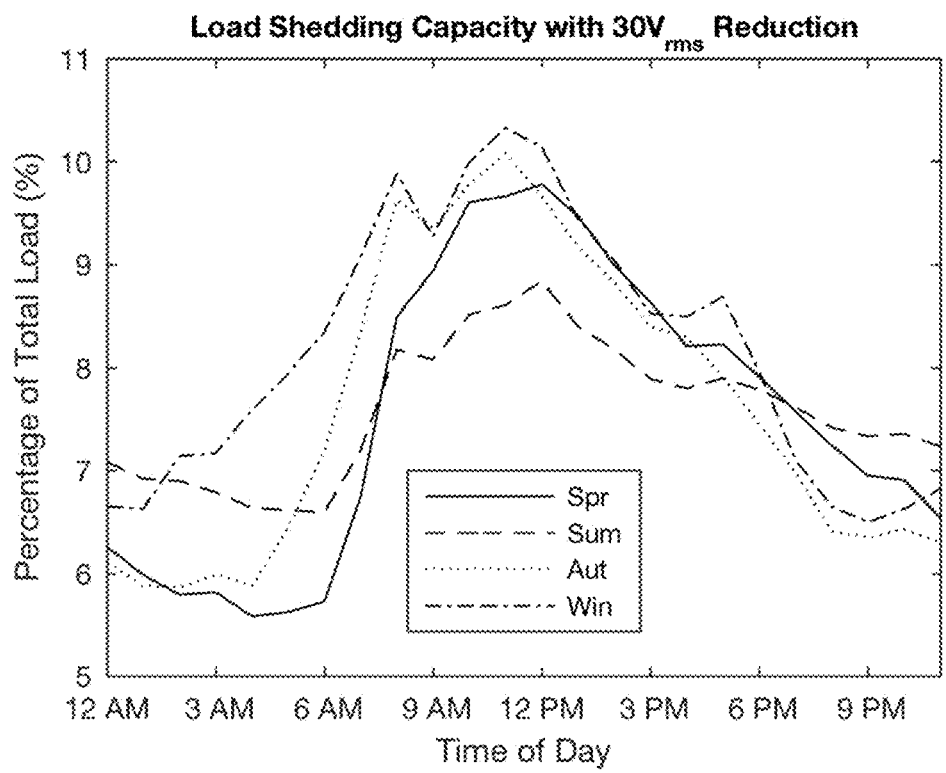

Here $T_1$ and $T_2$ are the start and end days of the time period T, and $\Delta P_{T,h}$ is the mean power flexibility over the period, where each period corresponds to each 90 day season. This gives some insight into how load flexibility changes throughout the day. FIGS. 3A-B show hourly mean aggregate load flexibility, $\Delta P_{T,h}$, for each season. Here the load flexibility is shown as a percentage of the total (mean) load for that season and time of day. Flexibility from a 12V reduction is shown in FIG. 3A, and for a 30V maximum reduction in FIG. 3B.

Unlike the generation availability curves, which differ dramatically from season to season, the load shedding capacity as a percentage of the load remains roughly similar, especially during peak consumption in the day. There are some key differences, particularly between summer and the other seasons. First, the flexibility at 30V reduction during summer is worse than the average from other seasons. This is because the dominant load is the air conditioner, which offers less flexibility than other common high energy loads such as hot water heaters, ovens, and electric furnaces, which are largely resistive loads. There is also notable seasonal difference is the night time flexibility percentage between the seasons. For a 30 Vrms reduction, the potential flexibility varies from 5% to 10% of the net load, which is a significant resource, considering this comes at minimal inconvenience to the consumer.

Figure 4:
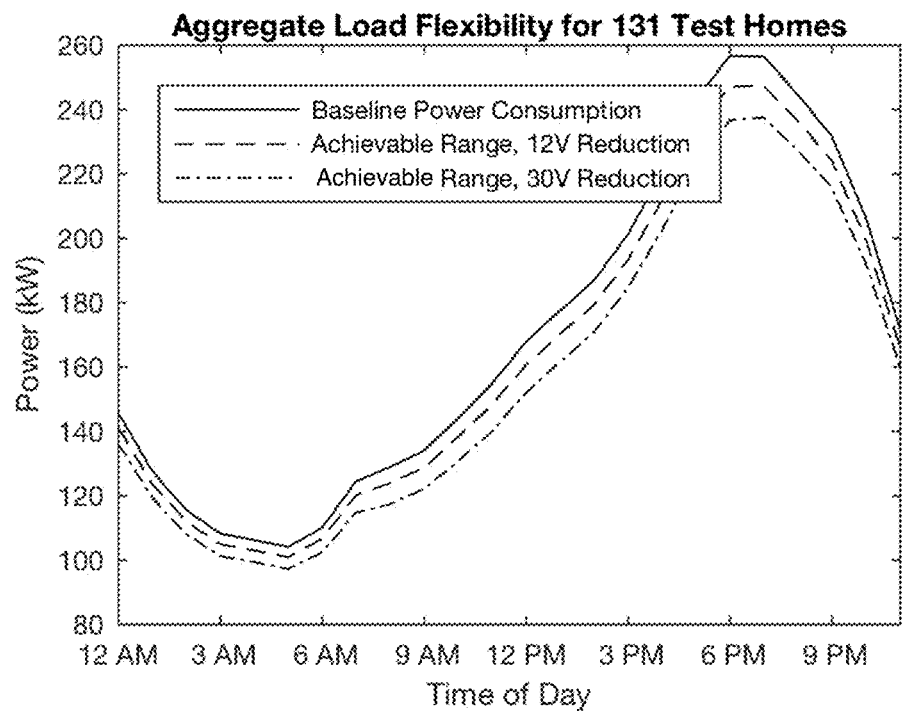
FIG. 4 shows aggregate load flexibility for the data set of FIGS. 2A-D.

Given the general similarity of these mean flexibility curves, it is reasonable to look at the mean hourly power consumption aggregate for the entire year, with the achievable load shedding regions with 12V and 30V reductions. Not only does the load shedding capacity increase as demand peaks, but the flexibility as a percentage of the load increases as well, meaning the most flexibility is generally available when it is most useful. For instance, at 6:00 PM, at peak demand, the load can be shed between 7.5-8%, depending on time of year. FIG. 4 shows hourly aggregate load shedding, averaged over the entire year. The solid curve shows the average aggregate power consumption. The dashed curve shows the mean shedding capacity for 12V reduction, and the dot-dashed curve shows shedding capacity for 30V maximum reduction.

III. SDF Converter Implementation and Performance

IIIA. Design Constraints

The performance requirements and practical considerations for the power electronics significantly constrain the space of possible topologies. First, from a safety perspective, the connection from the neutral at the load to neutral at the breaker box should remain unbroken. Otherwise it would interfere with the operation of ground fault interrupt safety devices. This eliminates the possibility of any isolated topology or matrix converter type topology. Additionally, the device should be able to disconnect the load from mains, which requires a switching branch from line at mains to line at the converter output. Efficiency is also important to the success of the device. Losses correspond to significant cost over the lifespan of the device. The typical AC to DC to AC approach has too many conversion steps and components to achieve sufficient efficiencies at low cost.

Figure 5:
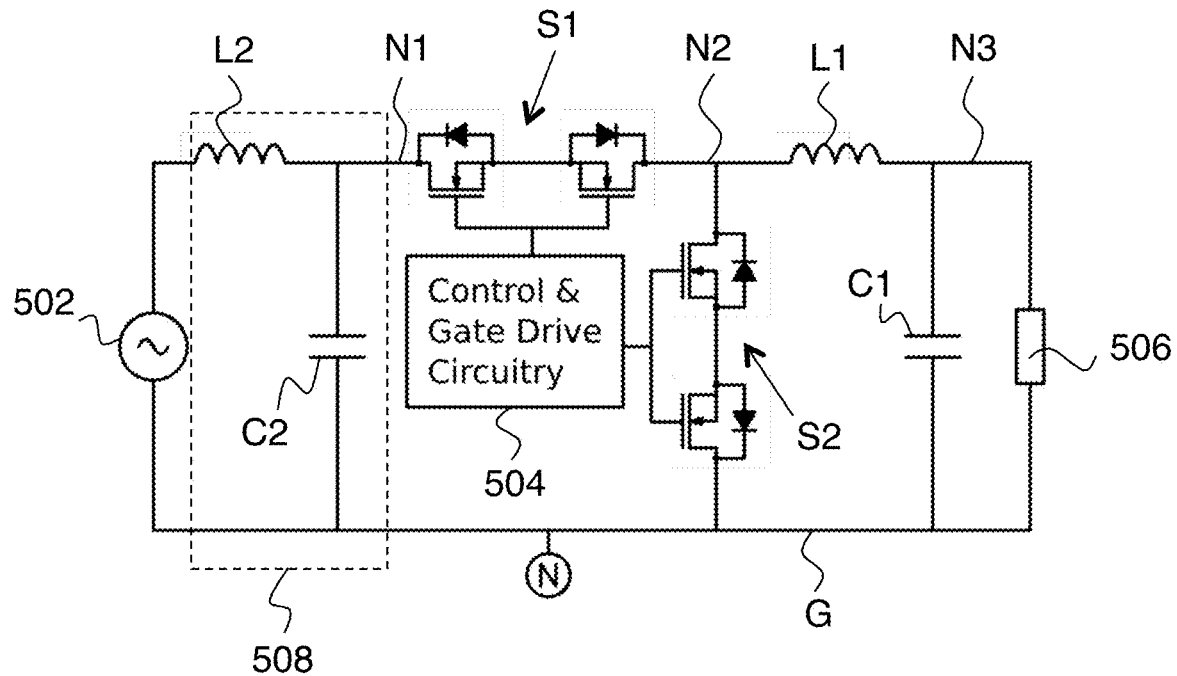
FIG. 5 shows an exemplary AC-AC buck converter suitable for use in embodiments of the invention.

We have decided to consider the use of a direct AC to AC buck converter topology, as shown in FIG. 5, as it is one of the few possibilities that satisfies the above requirements. In this example, the local control unit includes an AC to AC buck converter having a first switching element, a second switching element, a capacitor and an inductor. The AC to AC buck converter includes a first node N1, a second node N2, a third node N3 and a ground node G. The electrical main 502 is connected to the first node N1 and the ground node G. Here an optional filter 508 is shown including inductor L2 and capacitor C2, which can be regarded as being included in the electrical main or as being included in the buck converter. The load electrical circuit 506 is connected to the third node N3 and the ground node G. The first switching element S1 is connected to the first node N1 and to the second node N2. The second switching element S2 is connected to the second node N2 and the ground node G. The inductor L1 is connected to the second node N2 and to the third node N3. The capacitor C1 is connected to the third node N3 and to the ground node G. Switches S1 and S2 are controlled by switching controller 504 in accordance with known principles of switching-mode power converters. As shown on FIG. 5, there is an unbroken neutral connection between a neutral of the electrical main and a neutral of the load electrical circuit (i.e., they are both connected to the same ground node).

This topology has some considerable advantages. The device has a relatively low part count. Only four transistors are required to realize the two switching branches, there is no large DC-link electrolytic capacitor, and no rectification stage. Also, the topology can be used in continuous-on, non-switched-mode operation, eliminating switching and magnetics losses when no output voltage control is required. This mode is extremely efficient. The worst case is 98.5%, typically higher. Few switched-mode converters can achieve this kind of efficiency without great expense. This comes at the cost of not offering the possibility of reactive power control.

Also, direct AC to AC buck converters are subject to the commutation problem. There is no path for the current to flow during the dead-time where both switching branches are open. There are a number of solutions in the literature to provide a current path, by introducing an additional inductor element or a transformer, dissipative snubbers, or 4 stage commutation. However, these methods require additional parts, and often introduce isolation or interrupt the connection between load and mains neutral. We have found that it is possible to avoid the dead time problem simply with precisely tuned dead-time, and the fast switching speed offered by silicon carbide transistors.

IIIB. Performance Characterization

A 1.2 kW, 240 VAC proof-of-concept prototype has been developed. This prototype is capable of operation at various switching frequencies between 100 kHz and 300 kHz to accommodate a wide range of conversion ratios.

Figure 6A:
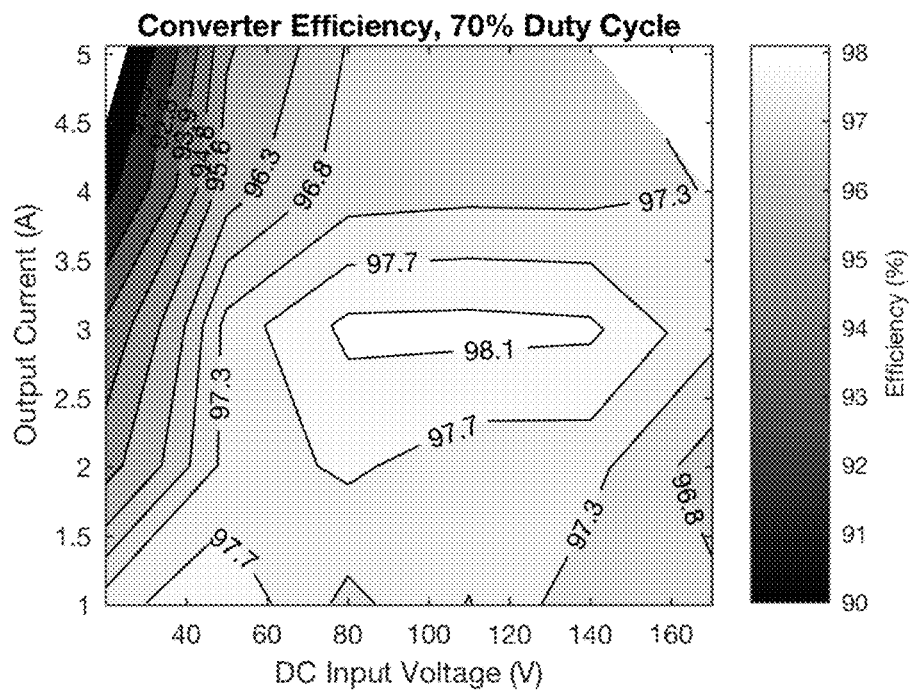
FIGS. 6A-C are contour plots of modeled converter efficiency for various operating conditions.
Figure 6B:
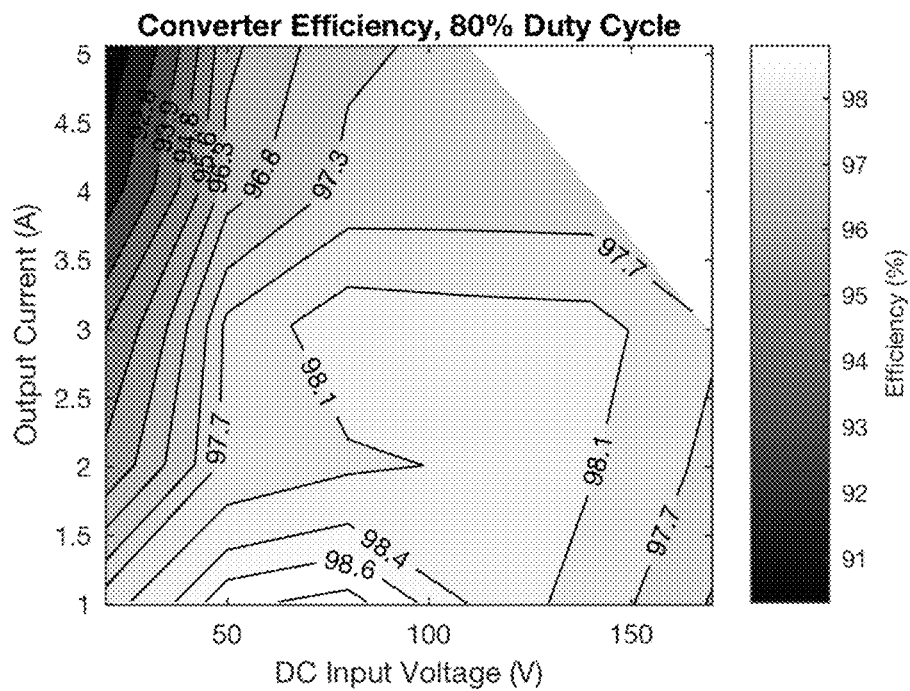
Figure 6C:
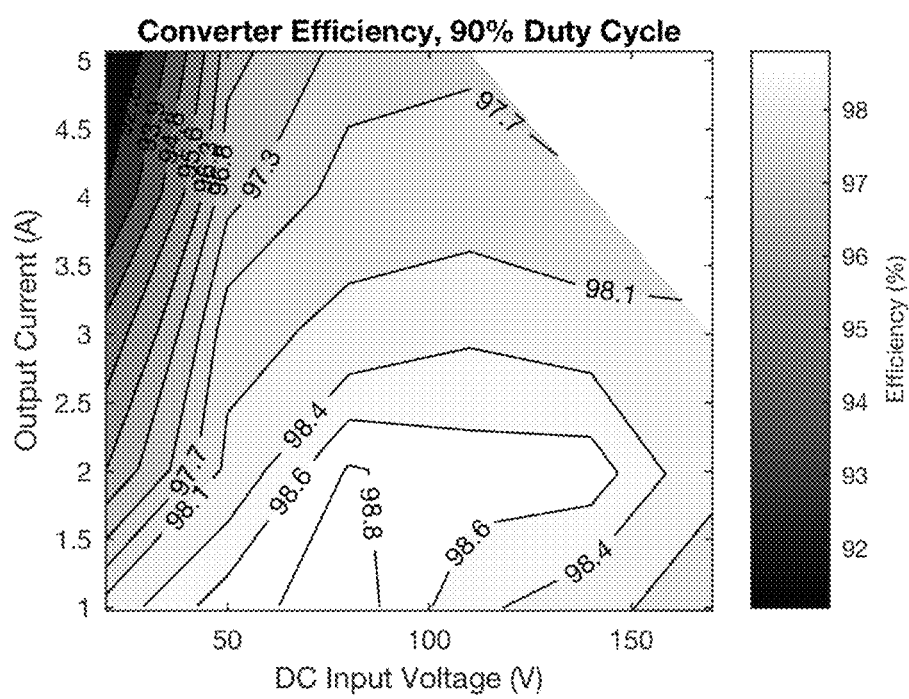

The continuous-on, non-switched-mode output resistance was measured to be 0.31Ω which results in a full-load efficiency of 99.4% in continuous on-operation at 240 VRMS (or 98.8% efficiency at 120 VRMS). To characterize the performance of the converter in switched mode operation, DC efficiency was measured for a grid of input voltages, output currents, and conversion ratios, shown in FIGS. 6A-C. While the test does not cover the entire range of operation of the converter, it shows that high efficiency operation with this simple configuration is possible. More specifically, FIGS. 6A, 6B, 6C show efficiency of the SDF converter from 20-180V input, 1-5 A output at a switching frequency of 145 kHz for duty cycles of 70%, 80%, 8=90%, respectively.

IIIC. Load Flexibility Verification

Figure 7:
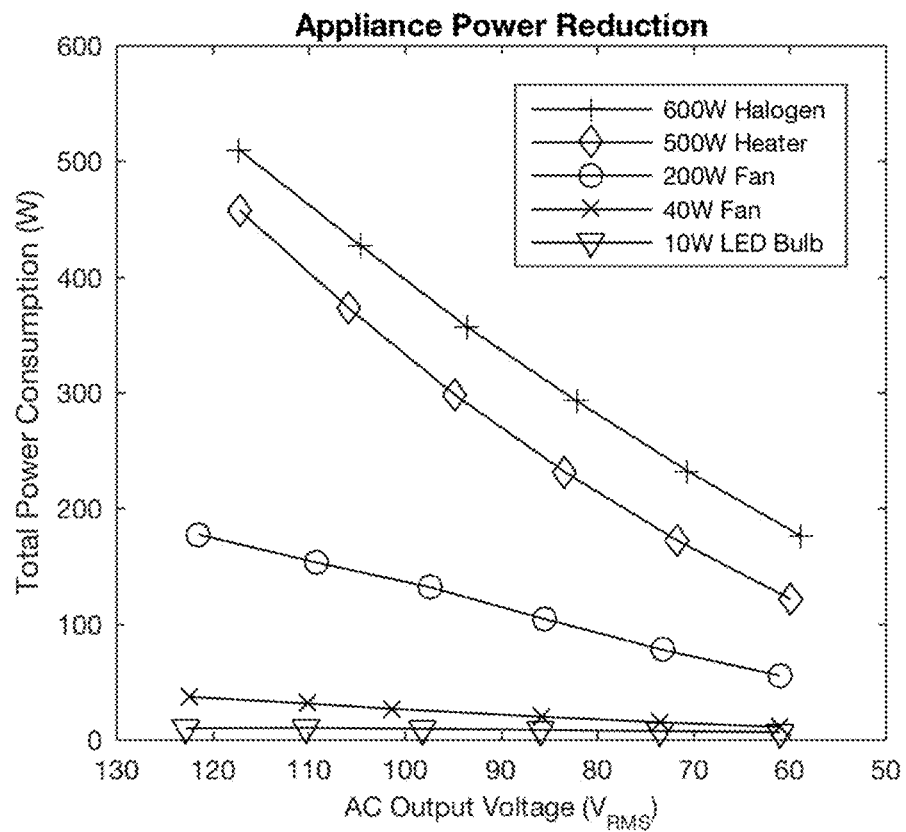
FIG. 7 is a plot showing appliance power consumption vs. converter output voltage for several different appliances.

The total power consumption including converter losses (measured at converter input), as well as power consumed by the appliance alone (measured at the converter output) is recorded for various 120 VAC appliances with a range of conversion ratios. FIG. 7 shows the total measured power consumption (including the converter losses) of various appliances for conversion ratios from 50-100%. Tests were conducted with the AC-AC converter operating at a switching frequency of 200 kHz. Each device continued to function throughout the entire voltage range, although at reduced output. All the devices exhibit significant reductions in power consumption, demonstrating the practical viability of the SDF.

Figure 8A:
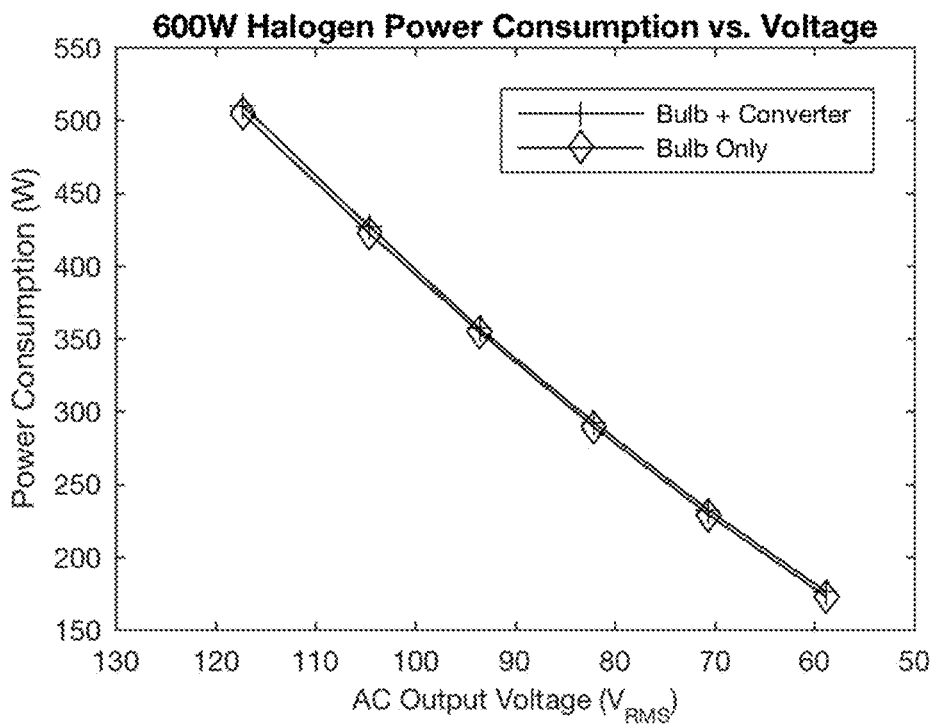
FIGS. 8A-C show plots of appliance and appliance+converter power consumption vs. converter output voltage for several different appliances.
Figure 8B:
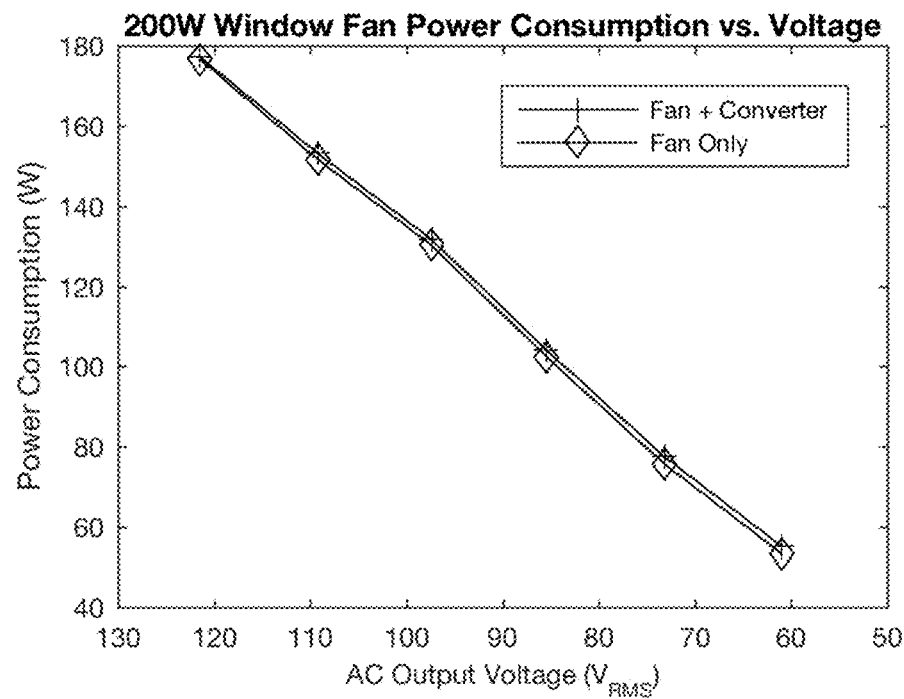
Figure 8C:
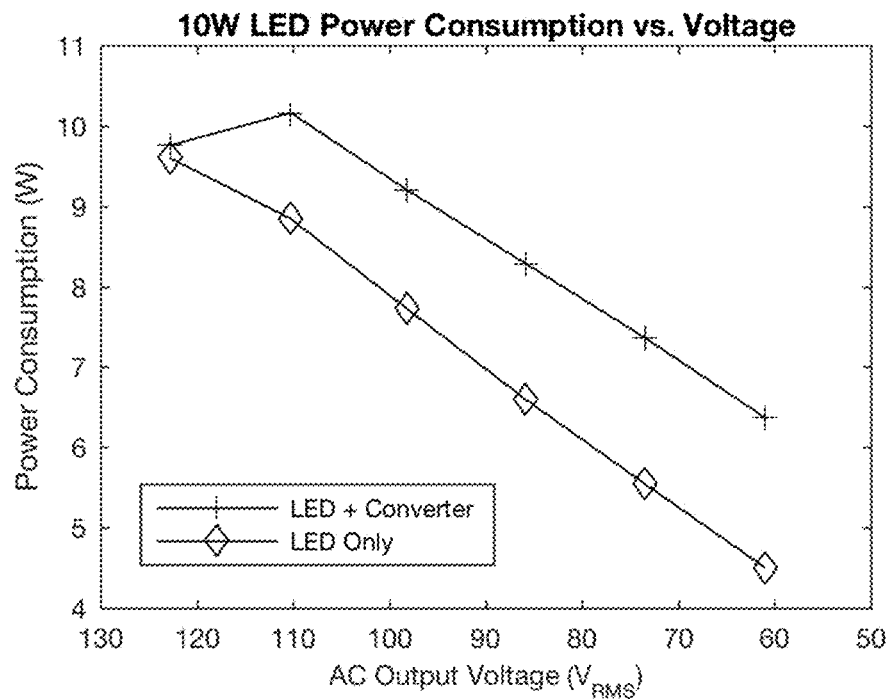

It is also important to verify that the converter losses do not significantly effect the load flexibility assumed in the statistical study above. Converter losses were not considered in the relationship between voltage and appliance power consumption. However, it is possible to demonstrate that the converter has a negligible impact on achievable flexibility. To validate this, we evaluate the difference between the power consumption of the appliance alone and the appliance with the added losses of the converter as the output voltage varies. In FIGS. 8A-C, the actual power consumption (appliance and converter) and ideal power consumption (appliance only) are plotted against converter output voltage for the following appliances: 600 W halogen bulb (FIG. 8A), 200 W window fan (FIG. 8B), and 10 W LED bulb (FIG. 8C).

Figure 9:
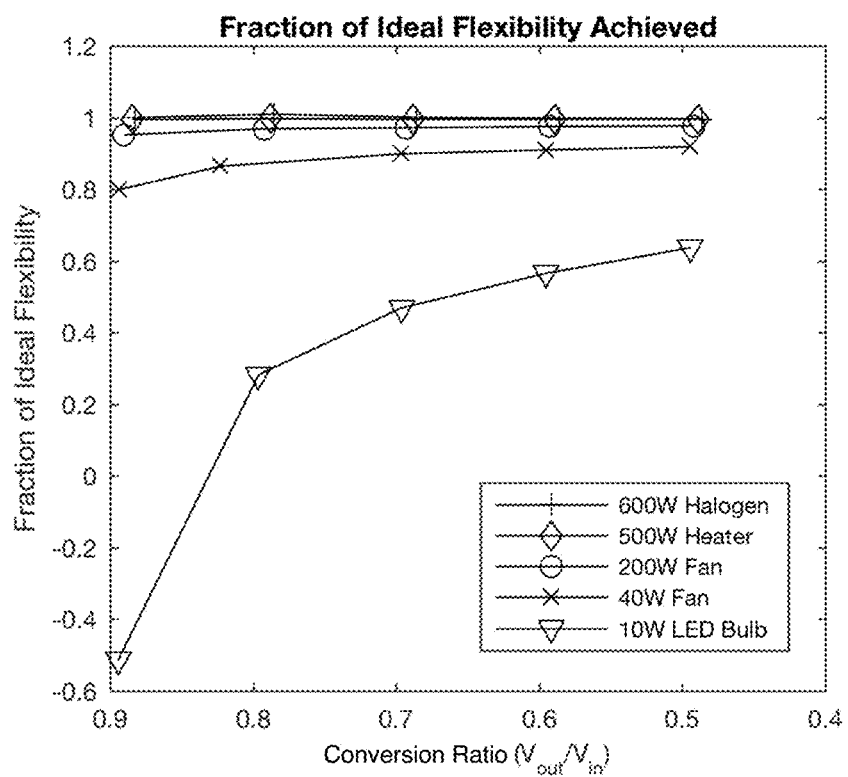
FIG. 9 is a plot showing the fraction of ideal power flexibility achieved vs. voltage conversion ratio for several different appliances.

For the larger two loads, the reduction in total power consumption tracks the reduction of power used by the load. In the case of the 10 W LED bulb, we see that the total power consumption is significantly higher than the LED bulb power. Because switching losses and magnetic losses have components that are independent of load power, at 90% duty factor, the converter losses are greater than power reduction in the bulb, resulting in an increase in power consumption. However, because the SDF is installed at the circuit level, not the appliance level, it is unlikely to be so lightly loaded. An entire lighting circuit with multiple bulbs would allow the SDF to capture a much more significant portion of the flexibility. We can visualize the efficacy of the converter by inspecting the ratio of achieved flexibility to ideal flexibility for each test load. FIG. 9 shows this ratio as a function of converter output voltage for each appliance tested. We see, as expected, that the LED load at 90% duty factor actually does not capture any of the flexibility, but rather consumes more power. However, the effective flexibility rapidly approaches one as the power increases. The converter captured a minimum of 80% of the flexibility for even the small, 40 W fan. Also note that the fraction of ideal can be greater than one (which occurs for the halogen bulb load) if the converter losses decrease sufficiently as the output voltage and power decrease.

IIID. Current Limiting

One of the major challenges for the SDF hardware is that the devices will be installed in series with, or as a replacement for a conventional circuit breaker. The safety and functional requirements for either case are essentially identical. First, the power topology should preserve the neutral line node to comply with basic regulations (e.g. compatibility with ground fault interrupt protections). The SDF should also prevent over-current faults under any short condition without any damage to the SDF device itself, including any series thermal fuses on the SDF device itself. The SDF will preferably use thermal fuses as a last line of defense only (e.g. in the case of defective components), and should not blow for a properly functioning unit under any short condition. Another challenge is that the SDF should be capable of delivering current to a short (or very low impedance) load for a limited amount of time, often called inrush current.

Conventional thermal-magnetic circuit breakers (which are almost universally used in residential and commercial wiring) achieve the functionality of allowing inrush currents while still tripping over longer time scales in a fairly crude way. Very large currents (often 10-20× the rated current) will trip the breaker immediately using a solenoid mechanism. Over longer periods of time, a bimetallic strip heats, and will trip in a period of time depending on the current level. Table 2 below illustrates the ranges for a common household breaker.

TABLE 2

Exemplary trip characteristics for circuit breakers

| Time to Trip | 1 sec. | 5 sec. | 1 min. | 10 min. |
| --- | --- | --- | --- | --- |
| Max Trip Current | 400 A | 180 A | 50 A | 30 A |
| Min Trip Current | 200 A | 80 A | 30 A | 20 A |

These massive currents pose a significant challenge for the design of solid-state electronics that will function in series with (or replace) such a breaker. Taking the brute-force approach, and sizing the power semi-conductors to withstand currents so significantly above the rating of the breaker would require over-sized and costly components. The provided solution is to leverage the same current sense and comparator hardware needed for the hysteresis controller to implement a permanent current clipping functionality, that automatically engages switched-mode operation as soon as the current exceeds the rating of the SDF. Rather than simply shutting down, the SDF will continue to deliver that rated current as long as the load demands it, or a fault timer runs down.

Figure 10:
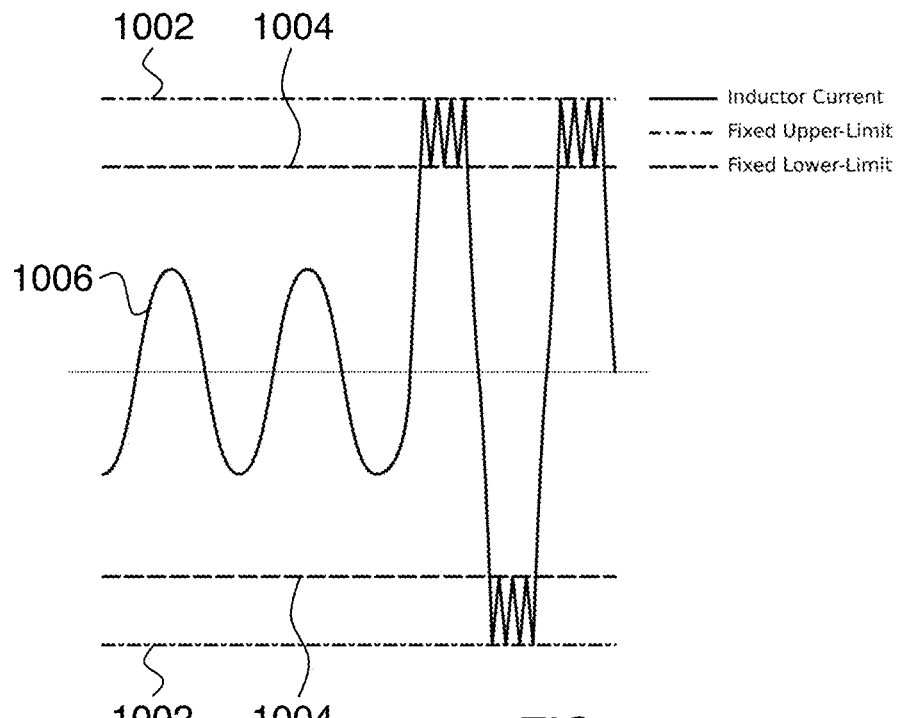
FIG. 10 schematically shows a operation of a preferred current limiting approach.

This functionality is shown in FIG. 10, which shows the output inductor current 1006 reaching the upper limit 1002, causing the switch-network to pull the output down to neutral, and when the current then reaches the lower limit 1004, the switch-network turns back on. This prevents the power semi-conductor components from needing to be over-sized, while still enabling the SDF to deliver currents to short impedance loads without damage to the SDF. This solves the problem of large inrush currents allowed by traditional thermal-magnetic breakers, while still sourcing sufficient inrush current to loads. This capability is present in both operating modes (pass-through and output voltage control).

IV. Conclusion

This work describes the Smart Dim Fuse system, which is a novel approach to aggregate distributed energy resource load control, by enabling circuit level load control without interruption of service. Using data from 131 homes, we evaluate the resource made available from such circuit level load control, demonstrating it is possible to achieve roughly 5-10% load flexibility without service interruption. During peak hours (around 6:00 PM), when load flexibility is most valuable, the load can be shed between 7.5-8%. We also present a proof-of-concept prototype that can provide the voltage control functionality, while respecting the standards for electrical wiring safety requirements. Experimental data using the prototype SDF show that it possible to capture nearly all of the potential flexibility from loads while operating a high efficiency using a relatively simple, low cost, and robust topology.

The invention claimed is:

1. Apparatus for managing electrical power consumption, the apparatus comprising:
   at least one local control unit configured to be connected between an electrical main and a load electrical circuit within a building;
   wherein the local control unit includes an AC-AC converter configured to alter an output AC voltage it delivers to the load electrical circuit responsive to a control signal without interrupting power to the load electrical circuit;
   wherein the output AC voltage can be set to any value in a predetermined voltage range according to the control signal; and
   a controller configured to automatically set the output AC voltage of the local control unit in order to control electrical power consumption by the load electrical circuit;
   wherein the load electrical circuit consumes electrical power but does not store electrical power or generate electrical power;
   wherein the local control unit is configured as a replacement for a circuit breaker in an electrical panel.

2. The apparatus of claim 1;
   wherein the local control unit includes an AC to AC buck converter having a first switching element, a second switching element, a capacitor and an inductor;
   wherein the AC to AC buck converter includes a first node, a second node, a third node and a ground node;
   wherein the electrical main is connected to the first node and the ground node;
   wherein the load electrical circuit is connected to the third node and the ground node;
   wherein the first switching element is connected to the first node and to the second node;
   wherein the second switching element is connected to the second node and the ground node;
   wherein the inductor is connected to the second node and to the third node; and
   wherein the capacitor is connected to the third node and to the ground node.

3. The apparatus of claim 2, wherein the AC to AC buck converter uses current hysteresis control with an outer control loop to set the output voltage.

4. The apparatus of claim 3, wherein the AC to AC buck converter is configured to limit its output current if the load electrical circuit short circuits.

5. The apparatus of claim 1, wherein the local control unit includes an unbroken neutral connection between a neutral of the electrical main and a neutral of the load electrical circuit.

6. The apparatus of claim 1, wherein the local control unit includes a pass-through mode with no output voltage control.

7. The apparatus of claim 6, wherein the local control unit is configured to limit its output current if the load electrical circuit short circuits.

8. A method for managing electrical power consumption, the method comprising:
   connecting one or more local control units each between an electrical main and a corresponding load electrical circuit within a building;
   wherein the local control units each include an AC-AC converter configured to alter output AC voltages they deliver to their corresponding load electrical circuits responsive to control signals without interrupting power to the load electrical circuits;
   wherein the output AC voltages can be individually set to any value in a predetermined voltage range according to the control signals; and automatically setting the output AC voltages of the local control units in order to control electrical power consumption by the load electrical circuits;

wherein the load electrical circuit consumes electrical power but does not store electrical power or generate electrical power;

wherein the local control unit is configured as a replacement for a circuit breaker in an electrical panel.

9. The method of claim 8, further comprising communicating between the local control units and a building-level base station with a communication network.

10. The method of claim 8, wherein a measurement sampling rate of current vs. voltage of load electrical circuits is 1 kHz or more.

11. The method of claim 8, further comprising using a database of power controllability vs. electrical load circuit to improve building-level load control, wherein the database is constructed at least in part from real time data on current vs. voltage of the load electrical circuits from the local control units.

12. The apparatus of claim 1, wherein the controller is configured to achieve a power consumption of the load electrical circuit according to an input set power command.

13. The method of claim 8, wherein electrical power consumption by the load electrical circuits is controlled to achieve a power consumption of the load electrical circuits according to an input set power command.

* * * * *